(12) United States Patent
Hall

(10) Patent No.: US 6,253,569 B1
(45) Date of Patent: Jul. 3, 2001

(54) PORTABLE STORAGE UNIT FOR GAME ANIMALS

(76) Inventor: James J. Hall, 4006 Hawick Dr., Houston, TX (US) 77084

( * ) Notice: Subject to any disclaimer, the term of this patent is extended or adjusted under 35 U.S.C. 154(b) by 0 days.

(21) Appl. No.: 09/307,203

(22) Filed: May 7, 1999

(51) Int. Cl.$^7$ ................................................... F25D 3/08
(52) U.S. Cl. .......................................... 62/457.2; 224/921
(58) Field of Search ................................. 62/457.1, 457.2; 190/110, 901, 903; 224/103, 921

(56) References Cited

U.S. PATENT DOCUMENTS

| | | | |
|---|---|---|---|
| 4,053,963 | 10/1977 | Matheu | 17/1 R |
| 4,110,916 | 9/1978 | Bemrose | 34/197 |
| 4,317,257 | 3/1982 | Engel | 17/21 |
| 4,529,240 | 7/1985 | Engel | 294/141 |
| 4,779,524 | 10/1988 | Wade | 99/476 |
| 4,785,766 | 11/1988 | Blalock, Jr. | 119/17 |
| 4,887,823 | 12/1989 | Hallett et al. | 280/19 |
| 5,237,838 | * 8/1993 | Merritt-Munson | 62/457.2 |
| 5,336,124 | 8/1994 | Garside | 452/125 |
| 5,361,603 | * 11/1994 | Merritt-Munson | 62/457.2 |
| 5,456,164 | 10/1995 | Bang | 99/468 |
| 5,467,734 | 11/1995 | Ho | 119/19 |
| 5,503,107 | 4/1996 | Satcher et al. | 119/19 |
| 5,761,992 | 6/1998 | Gallo | 99/468 |
| 5,854,238 | * 9/1999 | Rausch | 62/457.2 |
| 5,865,314 | * 2/1999 | Jacober | 62/457.2 |
| 5,974,826 | * 11/1999 | Baldwin et al. | 62/457.2 |

* cited by examiner

Primary Examiner—William E. Tapolcai
(74) Attorney, Agent, or Firm—Browning Bushman

(57) ABSTRACT

A portable animal storage unit comprising a pliable, foldable panel, said panel having an inner facing and an outer facing, a first side edge, a second side, a top edge, and a bottom edge, the inner facing and outer facing defining an insulating space therebetween, the inner facing being formed of a water-impervious material, the insulation space containing a thermal insulating material, a sack attached to the inner facing and having an openable end, the sack being made of a material that permits heat transfer, and a closure for holding at least the first side edge and second side edge together when the panel is folded such that the first side edge and second side edge substantially overlie one another.

15 Claims, 2 Drawing Sheets

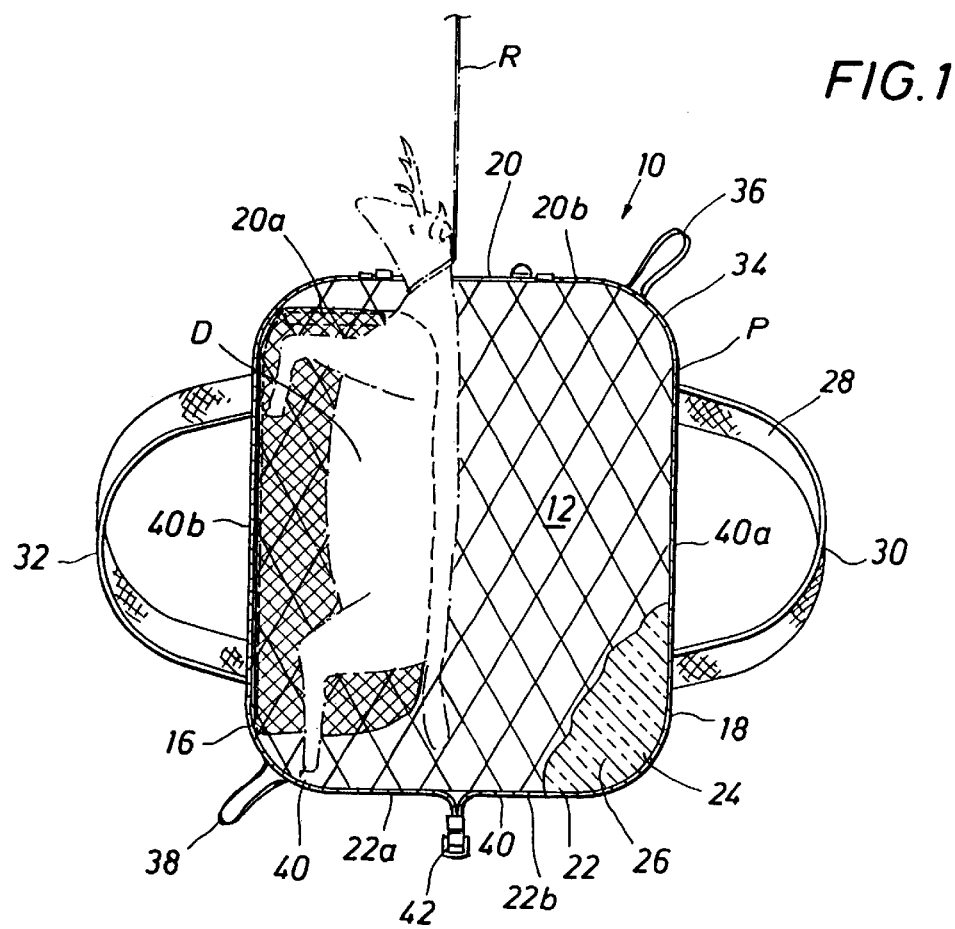
FIG.1
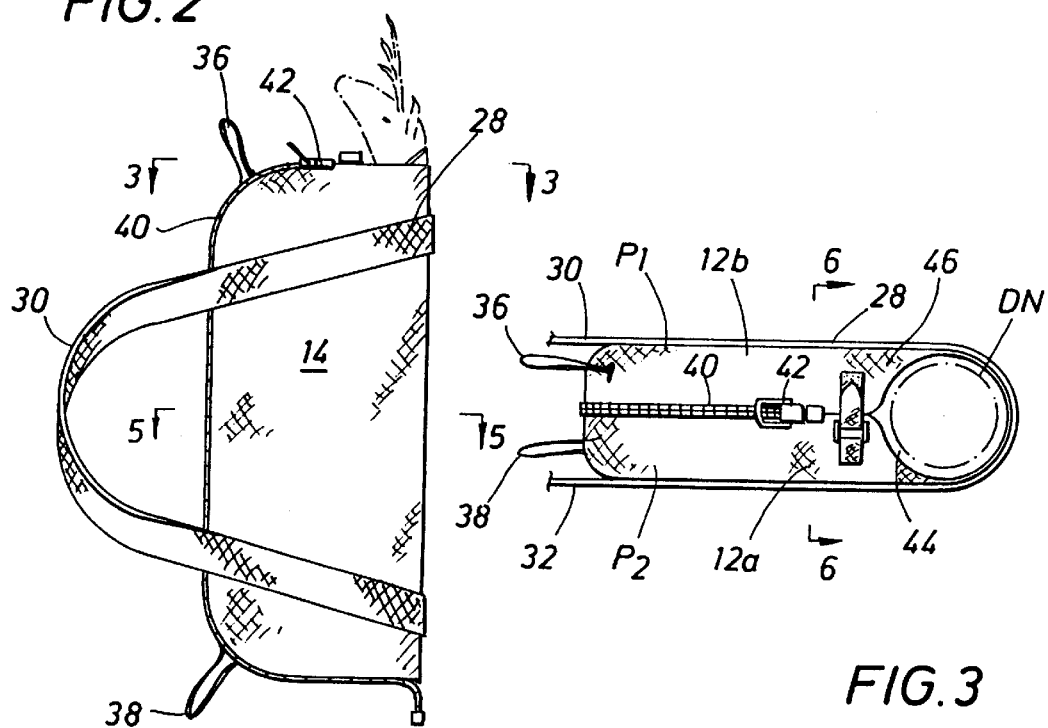
FIG.2
FIG.3

US 6,253,569 B1

PORTABLE STORAGE UNIT FOR GAME ANIMALS

BACKGROUND OF THE INVENTION

The present invention relates to hunting accessories and, more particularly, to a portable storage unit for storing and/or carrying a harvested game animal.

FIELD OF THE INVENTION

Hunting deer, elk, and other game animals is extremely popular. Generally speaking, the most productive hunting areas for game such as deer are remote from storage facilities that are adequate for preserving the game meat of a harvested animal. Furthermore, particularly in the Southern regions of the United States, a portion of the deer hunting season occurs when the temperatures are frequently mild and not infrequently warm. These warm temperatures, together with insects, can quickly spoil, or at least deleteriously affect the quality of, the meat and hide of the harvested animal.

Various techniques for preserving the meat and hide of a harvested game animal have been advanced, as set forth more fully in U.S. Pat. No. 5,761,992, incorporated herein by reference for all purposes. Thus, the carcass of the animal can be wrapped in cheesecloth to keep away insects, but that technique does not solve the problem of keeping the game meat at a proper temperature. Accordingly, it is frequently necessary for the harvested game to be transferred as soon as possible to cold storage facilities.

In U.S. Pat. No. 5,761,992, there is disclosed a portable unit adapted for use in preserving harvested deer or the like, the unit including refrigeration means to cool the interior of the storage unit to maintain the meat of the animal within a desired temperature range for aging and preservation.

SUMMARY OF THE INVENTION

It is therefore an object of the present invention to provide an improved storage unit for harvested game animals.

Another object of the present invention is to provide a storage unit for game animals that includes a source of cold to keep the meat of the animal in a desired temperature range.

Yet a further object of the present invention is to provide a flexible, insulated storage unit for harvested game animals that, when not in use, can be folded, rolled, or otherwise compacted for storage.

Another object of the present invention is to provide a storage unit for harvested game animals that protects the carcass of the game animal from insects.

The above and other objects of the present invention will become apparent from the drawings, the description given herein, and the appended claims.

According to the present invention, there is provided a storage unit for harvested game animals or the like comprising a pliable, foldable panel that has an inner facing, an outer facing, a first side edge, a second side edge, a top edge, and a bottom edge. The inner facing and outer facing define therebetween an insulating space, the inner facing being formed of a water-impervious material, the insulation space containing a thermal insulating material. A sack is attached to the inner facing, the sack having an openable end, and being made of a material that permits heat transfer. The storage unit further includes a closure for holding the first side edge and the second side edge together when the panel is folded such that the first side edge and the second side edge substantially overlie one another.

BRIEF DESCRIPTION OF THE DRAWINGS

FIG. 1 is a planar view of the storage unit of the present invention showing a deer lying on the unit and with the unit in its unfolded position.

FIG. 2 is a planar view of the storage unit of the present invention showing the storage unit ready for transport of the deer.

FIG. 3 is a view taken along the lines 3—3 of FIG. 2.

DESCRIPTION OF THE PREFERRED EMBODIMENTS

Figure 4:
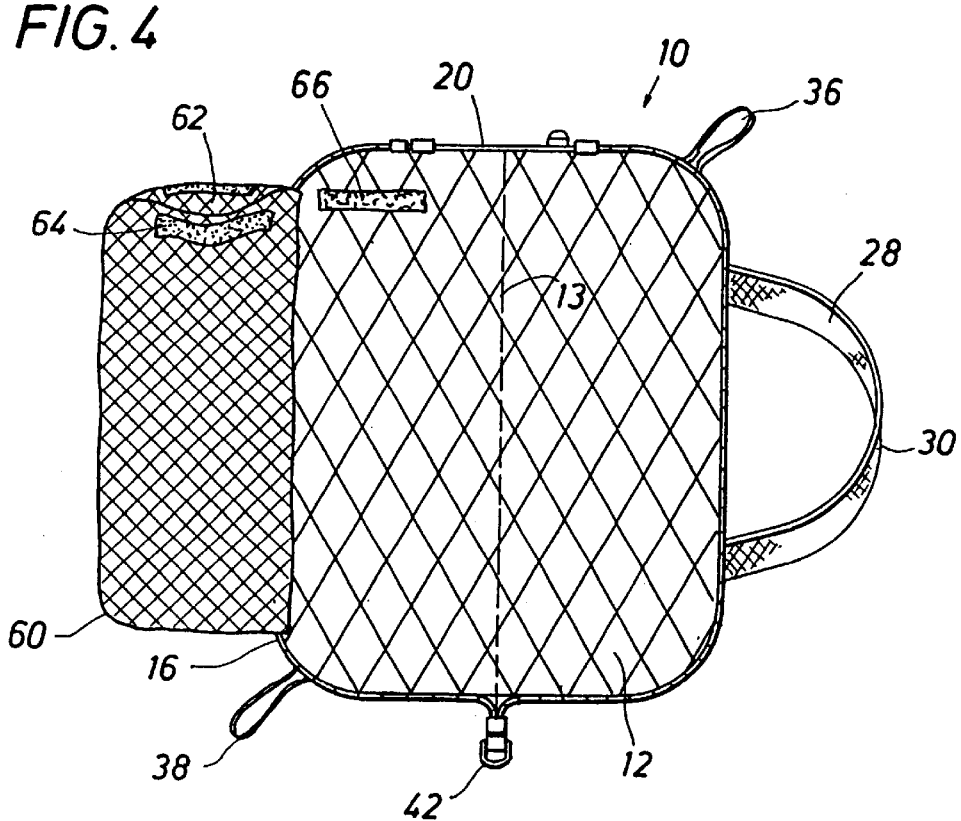
FIG. 4 is a view similar to FIG. 1 showing the storage unit in the unfolded position.

With reference first to FIGS. 1 and 2, the storage unit of the present invention, shown generally as 10, comprises a generally rectangular panel having an inner facing 12, an outer facing 14, a first side edge 16, an opposed second side edge 18, a top edge 20, and a bottom edge 22. Inner and outer facings 12 and 14 have generally coextensive peripheries and are joined to one another as by sewing or some other well-known means of fastening. Inner facing 12 and outer facing 14 are fastened to one another along their overlying peripheral edges so as to form an insulation space 24 therebetween. Insulation space 24 is filled with a suitable thermal insulating material 26. It will be appreciated that the thickness of the storage unit 10—i.e., the dimension between inner facing 12 and outer facing 14—can vary substantially depending upon the nature of the insulating material. For example, insulating materials having very low thermal conductivity will result in a panel having less thickness than one utilizing an insulating material that has higher thermal conductivity. While panel P is shown as being constructed of a single sheet of inner facing 12 and a single sheet of outer facing 14, it will be apparent that panel P could be formed of several sections adjoined together. For example, panel P could be in two sections, $P_1$ and $P_2$, that are adjoined as by sewing, as shown by the seam 13 shown as a dotted line in FIG. 4.

Secured to the outer facing 14 of panel P is a continuous strap 28 that, when the panel P is in the folded position as shown in FIG. 2, forms handles 30, 32 for carrying the storage unit. Secured to a corner 34 formed at the intersection of top edge 20 and second side edge 18 is a handle 36 that can be formed, for example, by a strap of suitable, flexible material secured generally along the periphery determined by adjoined outer facings 12 and 14. In like fashion, a second handle 38 depends from a second corner 40 that is diametrically opposed to corner 34, corner 40 being at the intersection of first side edge 16 and bottom edge 22. As best seen in FIG. 2, when the storage unit is in the folded position, handles 36 and 38 provide a convenient way for two persons to carry the storage unit with the harvested game inside. Secured around the periphery of panel 10 is a zipper 40 having a slide piece 42. As seen, zipper 40 has a first row of teeth 40a that extends generally from the midpoint of bottom edge 22 along second side edge 18 and partially along top edge 20. A second row of teeth 40b extends from the midpoint of bottom edge 22, along side edge 16, and partially along top edge 20. Accordingly, when panel P is folded as shown in FIG. 2 and slide piece 42 moved from the position shown in FIG. 1 to the position shown in FIG. 2 so that the teeth 40a and 40b are engaged along their full extent, there remains a portion of top edge 20 that is not secured together—i.e., zipper 40 does not extend completely across top edge 20, as shown in FIGS. 1 and 3.

Figure 6:
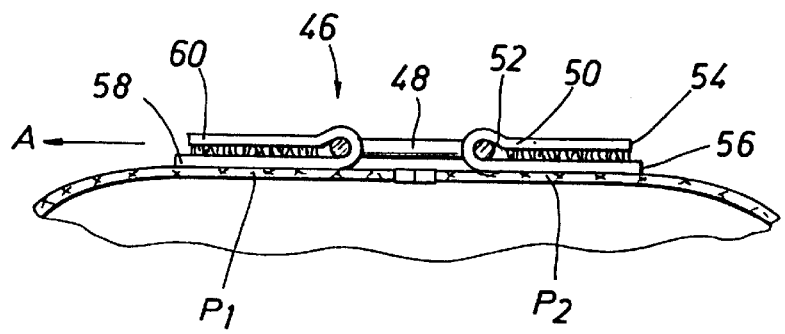
FIG. 6 is an enlarged elevational view taken along the lines 6—6 of FIG. 3.

As can be seen with reference to FIGS. 1 and 2, when panel P is folded, bottom edge 22 effectively forms two runs, 22a and 22b, that substantially overlie one another, runs 22a and 22b each being substantially half the length of edge 22. Likewise, top edge 20 has a first run 20a and a second run 20b, that, as in the case of runs 22a and 22b, substantially overlie one another when the panel P is in the folded position, as shown in FIG. 2. As noted above, the respective rows of teeth 40a and 40b of zipper 40 do not extend fully across top edge 20. Indeed, as can be seen in FIG. 1, teeth row 40a extends only partially across first run 20b of top edge 20 while teeth row 40b extends only partially along run 20a of top edge 20. In effect, in the folded position, panel P can be considered to have two panel sections $P_1$ and $P_2$, as shown in FIG. 3. Accordingly, when storage unit 10 is folded to the configuration shown in FIG. 2 and zipper 40 engaged for its full length, there is an opening 44 (see FIG. 3) into the enclosure determined by the overlapped panel sections $P_1$ and $P_2$. With reference to FIGS. 3 and 6, there is a fastener shown generally as 46 comprised of a D-ring 48 through which is passed a strip or strap 50 of suitable material, strip 50 forming an eyelet 52 by virtue of having its ends 54 and 56 secured together and to panel 12. As seen, strip 50 is attached to panel section $P_2$ while a strip 58 of a hook-and-loop-type securer, commonly sold under the trademark VELCRO®, has one end secured to panel section $P_1$. The free end 60 of strip 58 can be passed through D-ring 48 such that the free end 60 overlies the portion attached to panel section $P_1$ whereby the hooks and loops on the respective portions of strip 50 can be interengaged.

The purpose of the fastener 46 can best be understood by reference to FIGS. 2, 3, and 6. When the harvested deer D has been laid on the inner facing 12 in the manner shown in FIG. 1, the panel P is folded over such that side edge 18 substantially overlies side edge 16. At this point, zipper 40 is closed such that slide 42 has been moved from the lower edge 22 to the upper edge 20. As seen in FIG. 1, the deer is placed on the panel such that the deer's head extends beyond the top edge 20. Accordingly, when the zipper 40 is moved to the closed position, the deer's head will now protrude through opening 44. In FIG. 3, the neck of the deer is shown schematically in phantom as DN. To ensure a snug fit around the neck DN of the deer, fastener 46 is employed, and to this end, the free end 60 of the hook and loop strip 58 is passed through D-ring 48 and pulled in the direction of arrow A, thus pulling panel sections $P_1$ and $P_2$ tightly together and snugly around the deer neck DN. This ensures that insects and the like cannot gain entrance into the storage unit when the panel has been folded with the deer inside the storage unit, as shown in FIG. 2.

To ensure that the deer meat does not spoil, the storage unit of the present invention provides a way to keep the deer meat cold. To this end, and in one embodiment, shown in FIG. 4, a mesh sack 60 is secured to inside facing 12, generally adjacent side edge 16. Sack 60 has an openable end 62 that, as seen in FIG. 4, is adjacent top edge 20. In the embodiment shown, sack 60 is foldable relative to the storage unit 10—i.e., relative to facing 12—such that it can be moved from the position shown in FIG. 4, where it extends laterally outwardly from edge 16 to a position such as shown in FIG. 1, where it overlies inner facing 12. Sack 60 is provided with a strip 64 of a hook or loop fastening portion, strip 64 being sewn or otherwise suitably attached to sack 60. Attached to facing 12 is a strip 66 of other of the hook/loop fastening system. Accordingly, when sack 60 is folded from the position shown in FIG. 4 to the position shown in FIG. 1, the hook/eye fastening strips 62, 66 will be engaged, effectively holding sack 60 in the disposition shown in FIG. 1. While, as shown, sack 60 is permanently secured to facing 12 adjacent side edge 16, it will be appreciated that sack 60 could be permanently secured to facing 12 adjacent top edge 20. Further, sack 60 could be releasably attached to facing 12, for example, by using the hook/loop fasteners 64, 66. It will also be understood that the size of sack 60 can vary both as to width and length. Thus, sack 60 could be shorter (measured from openable end 62 to the opposite end) than shown in FIG. 4. "Openable," as used herein, means the sack 60 has a permanently open end or an end that can be selectively opened and closed.

Figure 5:
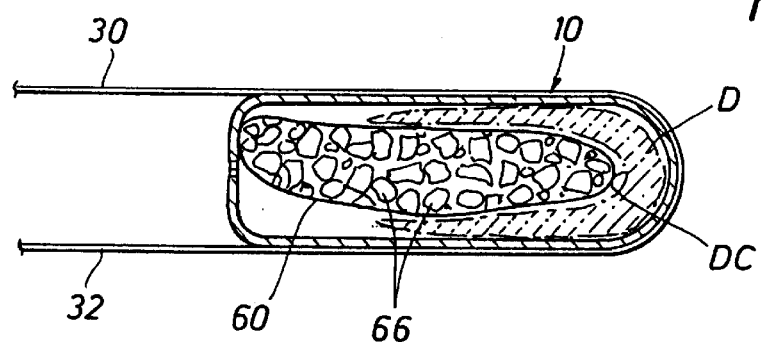
FIG. 5 is a view taken along the lines 5—5 of FIG. 2.

In use, once the harvested deer D is placed on inner facing 12, as shown in FIG. 1, a suitable source of solid coolant, such as dry ice, ordinary ice, containers of refrigerant get, etc., is placed through the open end 62 of sack 60. Most conveniently, this can be accomplished simply by inserting a plastic bag of ice, which is widely available, into sack 60. As seen in FIG. 5, once this has been done, sack 60 is folded and forced into the carcass cavity DC of the deer D, it being understood that at this point, the harvested deer would have been field dressed by removing the internal organs and entrails of the deer D in the well-known fashion. This field dressing typically results in the chest and underside of the deer being cut substantially along the entire length of the deer D.

The materials of construction of the storage unit 10 can vary widely. Facings 12 and 14 of panel P can be of the same or different flexible or pliable, and water-impervious material, e.g., fabric, so as to ensure that no water or bodily fluids from the harvested animal will pass through facing 12 into the insulation space between facing 12 and facing 13. Likewise, in the preferred case, facing 14 will be of a water-impervious material so as to ensure that the insulation 26 remains dry. In effect, facings 12 and 13 are both made of a flexible or pliable, foldable, water-impervious, or at least water-resistant, material and when secured together form a substantially water-tight insulation space therebetween. Numerous fabrics can be used for the manufacture of facings 12 and 14, such as, for example, various synthetic plastics; natural fibers, such as cotton, linen, and the like, treated so as to be water-impervious; nylon; canvass; etc. Indeed, the only requirement with respect to the materials of construction of facings 12 and 13 is that, at least as to facing 12, such materials be water-impervious and flexible enough to permit storage unit 10 to be folded, rolled, or otherwise compacted for storage. In any form, the outer facing 13 could be made of a material that is abrasive or cut-resistant while the inner facing 12 can be made of a material that does not necessarily possess abrasive resistance.

The insulating material 26 can also be one of numerous materials commonly used as thermal insulation. For example, insulation 26 can be of synthetic fleece material, flexible foam material, or virtually any other material that is flexible and conformable and is commonly used for the purpose of insulation, as, for example, in coats, jackets, sleeping bags, flexible or soft-sided coolers for food, and the like. The insulation can, for example, be fiberglass, expanded PTFE, goose down, NOMEX, THINSULATE, etc.

While the storage unit has been described with reference to the use of a zipper 40 as a closure device, it will be understood that other forms of closure, such as buttons, snaps, hook-loop fasteners, can be used as well.

The sack 60, used to carry the solid coolant, will generally be made of a flexible mesh, which can be a synthetic or natural fiber. In addition, the bag 60 could be made of other materials that are not in net or mesh form but that permit heat transfer between the solid coolant and the carcass of the harvested animal. It will be understood that sack 60 need not be permanently affixed but could, for example, be affixed to the inner facing 12 by means of hook-loop fastening systems or the like.

The fastener 46 need not be of the type shown but can take any form in which the sections $P_1$ and $P_2$ of the folded panel P surrounding the harvested deer's neck can be drawn tightly around the neck so as to prevent insects, dirt, or the like from ingress into the interior of the storage unit—i.e., when the storage unit is in the disposition shown in FIG. 2. Thus, for example, a drawstring arrangement could be used.

It can be seen that the storage unit of the present invention provides a most desirable means for preserving the hide and meat of a harvested animal, such as a deer. Note, for example, as shown in FIG. 1, that a rope R can be tied around the deer's neck and the deer D inside storage unit 10 hung from a tree or other such support while in the field. Thus, the animal's weight is supported by a rope or the like and not by the storage unit.

The handles 30, 32 provide a convenient means of carrying the storage unit when not in use while the handles 36, 38 make it easy for two people to carry the storage unit containing the harvested animal. Since virtually all of the materials of construction of the storage unit are flexible, when not in use, the storage unit can be easily rolled or folded into a compact form for storage or transportation.

While the word "edge" has been used with reference to describing the periphery of the panels 12 and 13, it will be appreciated that the storage unit 10, depending upon the type of insulation employed, may have a thickness as measured from the panel 12 to panel 13 of a one-half inch to several inches; i.e., the edge could be in the form of a narrow peripheral wall to which panels 12 and 13 are sewn or otherwise secured. On the other hand, with highly efficient insulation, the insulation space between the files 12 and 13 could be quite thin, as measured by the difference between panels 12 and 13, in which case panels 12 and 13 would essentially be sewn together along their peripheries.

The foregoing description and examples illustrate selected embodiments of the present invention. In light thereof, variations and modifications will be suggested to one skilled in the art, all of which are in the spirit and purview of this invention.

What is claimed is:

1. A portable animal storage unit comprising:

a flexible, foldable panel, said panel having an inner facing and an outer facing, a first side edge, a second side edge, a top edge, and a bottom edge, said inner facing and said outer facing defining an insulating space therebetween, said inner facing being formed of a water-impervious material, said insulation space containing a thermal insulating material;

a flexible sack attached to said inner facing of said panel, said sack having an openable end, said openable end being disposed adjacent said top edge, said sack being made of a material that permits heat transfer;

said bottom edge and said top edge having first and second runs that overlie one another when said panel is folded, there being a closure for holding said first and second runs of said bottom edge together, a closure for holding at least a portion of said first and second runs of said top edge together, and a closure for holding said first side edge and said second side edge together when said panel is folded such that said first side edge and said second side edge substantially overlie one another.

2. The storage unit of claim 1 wherein said second facing of said panel is made of a water-impervious material.

3. The storage unit of claim 1 wherein said closure comprises a zipper.

4. The storage unit of claim 1 wherein when said panel is folded such that said first side edge and said second side edge substantially overlie one another, there is formed an opening defined by said first and second runs of said top edge and there is a first fastener for releasably urging the folded halves of said panel together to selectively adjust the size of said opening.

5. The storage unit of claim 1 wherein said sack is made of a porous fabric.

6. The storage unit of claim 1 including a second fastener for selectively, releasably fastening said sack to said inner facing of said panel, said second fastener being located adjacent said openable end of said sack.

7. The storage unit of claim 1 wherein said sack is filled with a solid coolant.

8. The storage unit of claim 7 wherein said solid coolant comprises dry ice.

9. The storage unit of claim 7 wherein said solid coolant comprises ice.

10. The storage unit of claim 9 wherein said ice is contained in a plastic bag.

11. The storage unit of claim 1 comprising a first handle on a first corner of said panel formed by the intersection of one of said side edges and said top edge and a second handle on an opposite, diagonal corner of said panel formed by the intersection of the other of said side edges and said bottom edge.

12. The storage unit of claim 11 wherein each of said handles comprises a strap secured to said panel.

13. The storage unit of claim 1 wherein said sack is permanently attached to said inner facing of said panel.

14. The storage unit of claim 1 wherein said sack is attached to said inner facing adjacent said side edge.

15. The storage unit of claim 1 wherein said sack is releasably attached to said inner facing of said panel.

\* \* \* \* \*